US005331157A

United States Patent [19]

Franzen

[11] Patent Number: 5,331,157

[45] Date of Patent: Jul. 19, 1994

[54] METHOD OF CLEAN REMOVAL OF IONS

[75] Inventor: Jochen Franzen, Bremen, Fed. Rep. of Germany

[73] Assignee: Bruker-Franzen Analytik GmbH, Fed. Rep. of Germany

[21] Appl. No.: 981,756

[22] Filed: Nov. 25, 1992

[30] Foreign Application Priority Data

Nov. 27, 1991 [DE] Fed. Rep. of Germany ....... 4139037

[51] Int. Cl.[5] ........................ B01D 59/44; H01J 49/00

[52] U.S. Cl. ..................................... 250/282; 250/292

[58] Field of Search ................................ 250/282, 292

[56] References Cited

U.S. PATENT DOCUMENTS

| | | | |
|---|---|---|---|
| 4,749,860 | 6/1988 | Kelley et al. . | |
| 4,761,545 | 8/1988 | Marshall et al. | 250/291 |
| 4,818,869 | 4/1989 | Weber-Graban | 250/292 |
| 4,882,484 | 11/1989 | Franzen et al. . | |
| 5,075,547 | 12/1991 | Johnson et al. | 250/292 |
| 5,170,054 | 12/1992 | Franzen | 250/292 |

*Primary Examiner*—Bruce C. Anderson

*Attorney, Agent, or Firm*—Hill, Steadman & Simpson

[57] ABSTRACT

A method of clean removal of ions from an ion trap mass spectrometer removes ions having a mass greater than a desired ion mass m using non-linear resonance. The ion trap mass spectrometer includes two end cap electrodes and an annular electrode. A high-frequency quadrupolar field with at least one superposed weak multipolar field is generated in the ion trap mass spectrometer. Higher mass ions are eliminated with minimal loss of ions having the desired mass m by adjusting the amplitude of a storage HF so that one of the physically determined non-linear resonance conditions of the multipolar field is satisfied for ions of mass m+1. The ions are weakly oscillated by applying an HF excitation voltage to the end caps of the ion trap mass spectrometer, such that ions of mass m+1 receive energy through non-linear resonance from the storage HF and leave an ion trap of the ion trap mass spectrometer. Ions having the desired mass m remain inside an ion cage.

12 Claims, 4 Drawing Sheets

METHOD OF CLEAN REMOVAL OF IONS

BACKGROUND OF THE INVENTION

1. Field of the Invention

The present invention relates generally to a method of clean removal of ions of mass m+1 from a Paul ion trap mass spectrometer.

2. Description of the Prior Art

Before performing certain investigative procedures on ions having a desired mass m in an ion cage, ions of a desired mass m must be at least partially "isolated" by removing undesired ions of a mass other than mass m from the ion cage, such that only ions of mass m remain in the ion cage. Such procedures include, for example, generating daughter-ion spectra in the ion cage and investigating ion/molecule reactions of specific ions.

Ions must be initially generated from gaseous starting substances in order to then isolate ions of the desired mass m. The ions are usually generated inside the ion cage. Typically, the ions are generated by electron impact ionization, in which a beam of electrons is directed into the cage. Other methods of ionization can also be used, such as photon ionization using lasers or chemical ionization.

In all of the known ionization processes wherein ionization occurs inside the ion cage, ions having a mass other than the desired mass m are generated simultaneously with ions of mass m, even when pure gaseous starting substances are introduced into the ion cage. However, ions of the desired mass m are necessary in order to perform the above-mentioned investigative procedures. Further, where complex mixtures are used as starting substances, such as in the investigation of pyrolysis products, isolating ions of the desired mass m is even more difficult than isolating ions generated from a substantially pure starting substance.

Of the known ion isolation methods, the oldest method of eliminating all undesired ions uses a corner of the ion stability graph. If the electrodes of the ion cage are supplied with a precisely adjusted DC voltage and high-frequency (HF) amplitudes, the working point for the ions to be isolated can be localized to a corner of a known a/q stability graph of a quadrupole cage. Therefore, all ions other than ions of the desired mass m, or undesired ions, will be outside the stability region. Kinetic energy is transferred from the high-frequency (HF) field to the undesired ions, causing undesired ions to leave the quadrupole cage.

The quadrupole cage can also be operated in the above-described mode during ionization. However, operating the quadrupole cage in the above-described mode during ionization results in a low yield of ions of the defined mass m, since high losses of ions occur in this region. Further, the method cannot be applied to non-linear quistors with octupolar fields. Non-linear quistors have certain advantages over other kinds of quadrupolar cages, as the non-linear resonance conditions run through the corners of the stability region.

In a non-linear quistor, a non-linear field pattern from the center of the quistor to the annular electrode and the end cap electrodes is generated by superposition of higher-order multipolar fields. For example, given a quistor, a weak octupolar field is superimposed on a quadrupolar field. In this case, ion resonance occurs if the secular frequencies $f_r$ and $f_z$ of the ions in the r and z direction satisfy the equation $f_r+f_z=Fs/2$, where Fs is the frequency of the storage high-frequency (HF). The resonance condition is normally written as $\beta_r+\beta_z=1$, which defines a curve in the a/q stability graph that extends through both corners used for ion isolation and intersects the line $a_z=0$ at approximately $q_z=0.78$.

The non-linear resonance has virtually no effect for ions undergoing extremely weak oscillation or for ions remaining in the resonance state for a short time. However, if the amplitude of oscillation of the secular motion increases or if the ions remain in the resonance state for a longer time, kinetic energy from the storage HF is transferred to the ions. The effect is greater the closer the working point is to the edge of the stability region. The amplitude increases exponentially and the ions leave the cage, mainly by striking the electrodes. Further, the resonance condition satisfied by the equation $\beta_r+\beta_z=1$ intersects the two useful corners of the stability graph, resulting in an almost complete loss of the desired ions.

Another known method for isolating ions, in which HF voltages are used exclusively (i.e., no DC voltage), is discussed in U.S. Pat. No. 4,749,860. An HF ejection voltage is applied at a fixed frequency between the end caps of the ion cage. The frequency is selected such that ions having a mass one unit higher than the desired mass m, or ions of the mass m+1, are ejected. Ejection of the m+1 ions is achieved if the secular frequency is in resonance with the ejection frequency. The amplitude of the HF voltage is then increased, so that all ions of lower mass are eliminated when they cross the instability boundary $\beta_z=1$. The process is continued until the mass m−1 has been eliminated.

Using the same method, when the HF amplitude is increased, the fixed ejection frequency ejects ions of progressively higher masses, beginning with the mass $m_1$, as the secular frequencies of these ions is altered with the HF amplitude. Ions having progressively higher masses experience resonance and are ejected. The accuracy of this ion ejection process, however, is limited. For example, if the neighboring mass m+1 is to be completely eliminated within a reasonable time, the losses of mass m will be high (more than 90%). On the other hand, if the mass m must be obtained with a high yield, the mass m+1 will not be completely ejected. The process is also disturbed considerably by space charge effects when a number of ions are contained in the cage.

Yet another known method for isolating ions was proposed by R. Yost et al. during the AMS meeting in 1991. In this method, both instability limits $\beta_z=1$ and $\beta_z=0$ are used by applying suitable HF amplitudes followed by positive or negative DC voltages. This method is superior to the two previously discussed methods for isolating ions. However, the instability limit $\beta_z=0$ is not sharply delimited, but rather forms a very soft transition. Thus, a small percentage of the masses m+1 and m+2 are still present, even if the proportion of these ions in the starting substance is relatively low.

In yet another method for isolating ions, a special form of sextupole and/or octupole potential is superposed on the quadrupole potential by providing electrodes having a special shape. The shape of the electrodes increases the withdrawal rate of analyzed ions without altering the mass resolution capacity. This method is discussed, for example, in German Patent Application P 40 17 264.3-33, which is not a prior publication.

SUMMARY OF THE INVENTION

It is an object of the present invention to provide a method for isolating ions having a selectable mass m, in which the neighboring masses are completely eliminated, even where the neighboring masses $m-1$ and $m+1$ are more densely populated than the selectable mass m. Yet another object of the present invention is to provide a method for isolating ions resulting in a high yield of the isolated ions.

The above objects are inventively achieved in a method for isolating ions from an ion trap mass spectrometer, wherein an amplitude of a storage HF is adjusted such that one of the physically determined non-linear resonance conditions of the multipolar field is satisfied for ions of mass $m+n$, where $n \geqq 1$. The ions are set in weak oscillation by applying a HF voltage to end caps of the ion trap mass spectrometer to excite the ions to the end caps, so that ions of mass $m+n$ receive energy through non-linear resonance from the high-frequency storage field and are ejected from an ion trap of the ion trap mass spectrometer, whereas ions of mass m remain inside an ion cage of the ion trap mass spectrometer.

The method of the present invention can be carried out using a suitable ion trap mass spectrometer. Such an ion trap mass spectrometer may be, for example, an ion trap mass spectrometer known as a Paul trap. The ion trap mass spectrometer includes two end cap electrodes and one annular electrode. A high-frequency quadrupolar field with at least one superposed weak multipolar field is generated in the ion trap mass spectrometer.

Thus, in accordance with the principles of the present invention, a method for the clean removal of ions having a mass $m+n$ with minimal loss of ions of mass m from an ion trap mass spectrometer, such as an ion trap mass spectrometer according to Paul, is provided.

In one embodiment of the method of the present invention, a weak octupolar field can be superimposed on the quadrupolar field and the ions of mass $m+n$ reach the octupolar resonance $\beta_z+\beta_r=1$.

In another embodiment of the method of the present invention, a frequency sweep of a HF excitation voltage for exciting the ions between the end cap electrodes is used for weak oscillation of the ions around mass $m+n$, and simultaneously removes all ions of mass greater than $m+n$ from the ion trap by resonance excitation. For example, for $n=1$, all ions of mass greater than $m+1$ are removed from the ion trap by resonance excitation.

In yet another embodiment of the method of the present invention, the removal process is successively applied to masses $m+1, m+2, \ldots, m+n$.

In still another embodiment of the method of the present invention, more than one neighboring mass is eliminated by non-linear resonance, and the remaining portion of the masses other than mass m are eliminated by sweeping with the HF excitation voltage.

Additionally, in an optional step, the storage HF amplitude can be briefly raised to a value at which all ion masses below m, but no the ion mass m itself, are exposed to the instability conditions of the quadrupolar field and removed from the ion trap in order to remove all ion masses below m. This step can be applied either before or after the elimination of masses by non-linear resonance.

In another embodiment, the frequency sweep of the HF excitation voltage is brought about at increasing frequency corresponding to sweeping the ion masses from higher to lower values.

Moreover, the rate of withdrawal of the analyzed ions can be increased by giving a special shape to the electrodes without effecting the mass resolution capacity. Given the special shape of the electrodes, the quadrupole potential is:

$$P_q=(A_2/4z_o^2)(r^2-2z^2)[U\text{-}V\cos(\chi t)],$$

is overlaid only by a sextupole potential $$P_s=(A_3/4z_o^4)(3r^2z-2z^3)[U\text{-}V\cos(\chi t)]$$

and/or an octupole potential $$P_0=(A_4/4z_0^4)(r^4+8z^4/3-8r^2z^2)[U-V\cos(\omega t)],$$

with $r$=the distance from the z axis,
$z$=the distance from the plane $z=0$,
$z_0$=the distance of an end cap from the center $z=0$,
$A_2$=the thickness of the quadrupole field,
$A_3$=the thickness of the sextupole field,
$A_4$=the thickness of the octupole field,
$U$=the value of the DC voltage,
$V$=the peak value of the AC voltage,
$\omega$=the annular frequency of the AC voltage, and
$t$=time.

A satisfactory elimination of lighter masses up to and including $m-1$ is well known to those of ordinary skill in the art. Therefore, only elimination of heavier masses will be described herein in detail.

Preferably, in accordance with the principles of the method of the present invention, a non-linear ion cage mass spectrometer is used with superposition of weak multipolar fields. Such a non-linear ion cage mass spectrometer is discussed, for example, in German Patent Application P 40 17 264.3-33.

In accordance with the principles of the present invention, non-linear resonance is used to isolate ions of a desired mass m. After "purification" of the ions by removing ions of lower mass, including ions of the mass $m-1$, the HF amplitude is suddenly increased for a predetermined time period, preferably on the order of about 500 microseconds. The HF amplitude is chosen such that the desired ions of mass m are moved directly adjacent to the point of the non-linear resonance $\beta_r+\beta_z=1$ on the axis $a=0$ of the stability graph. Preferably, the neighboring mass $m+1$ lies directly on the resonance point. As the resonance is very sharp, very accurate adjustment is necessary.

It is particularly advantageous to first eliminate the lower mass ions up to $m-1$ in a known manner, as their elimination reduces the space charge inside the ion cage. Reducing the space charge inside the ion cage is advantageous for purifying masses greater than m from the ion cage.

The higher masses are then removed from the ion cage by sweeping the ejection frequency from lower to higher frequencies, thus purifying the ion mass. When the ejection frequency begins at lower frequencies, purification of higher masses begins. Advantageously, beginning at lower frequencies eliminates many ions at a relatively early stage, thus reducing the space charge in the ion cage prior to the critical portion of the purification process. This is particularly advantageous because it has been found that space charge effects appreciably interfere with the subsequent process steps.

The process is completed at a distance from the mass m+1. Due to the slight increase in the oscillation amplitude, ions of mass m+1 are already ejected from the ion cage, although they are not resonant. Thus, the non-linear resonance already has an effect on the m+1 ions. The non-linear resonance ejects ions when their secular frequency reaches the frequency of the non-linear resonance, and the oscillation of the ions exceeds a given amplitude. The energy for the subsequent rapid exponential increase in the oscillation amplitude is obtained from the storage HF. The desired ions of mass m are at a very stable point directly adjacent the non-linear resonance. Thus, the immediately neighboring ions of mass m+1 are completely removed from the ion cage.

The next neighboring ions of mass m+2 can be eliminated by a variety of methods. Either the HF amplitude is slightly reduced in order to bring the ions of mass m+2 to the point of non-linear resonance, or purification is repeated at the lower-amplitude ejection HF. Reducing the HF amplitude causes ejection to be carried out as previously described concerning the higher mass ions. However, lower-amplitude ejection HF is preferable. In both cases, undesired ions can be eliminated completely, given a 40% yield of desired ions.

It is particularly advantageous in a preferred embodiment of the method of the present invention to apply the ejection HF across the end caps of the ion cage at a frequency which coincides with the secular frequency of one of the neighboring masses+1 or m+2 or higher, such that ions of mass m+1 are ejected by the non-linear resonance and the amplitude of the storage HF is continuously or stepwise reduced to lower values. As a result, adjacent masses m+2, m+3, . . . , m+n, are ejected by the combined effect of the ejection frequency and the non-linear resonance.

In accordance with the principles of method of the present invention, a region of particularly high stability lies directly adjacent the working point using non-linear resonance, a surprising effect. The method of the present invention is particularly effective for eliminating ions with masses not exceeding m−1, if the ions having less than the desired mass are eliminated prior to or subsequent to applying the non-linear resonance step by controlled raising of the HF amplitude to a value just below the value at which the desired mass is stable.

The purification process can then be repeated on the lower-mass side in order to remove any daughter ions produced during the purification process.

In accordance with the principles of the method of the present invention, a first purification process on the lower-mass side, a double coarse elimination process on the higher-mass side, a fine purification on the higher-mass side, and a second purification on the lower-mass side is exactly 20 milliseconds in duration, and produces a 40% yield of the desired ions while reducing the neighboring masses by at least 99%.

Additionally, not only an ion cage mass spectrometer as discussed in German Patent Application P 40 17 264.3-33 can be employed, but also a non-linear quistor, as discussed, for example, in U.S. Pat. No. 4,882,484, incorporated herein by reference, can be used in accordance with the principles of method of the present invention.

Other advantages and features of the invention will be readily apparent from the following description of the preferred embodiments, the drawings and claims.

DETAILED DESCRIPTION

Figure 1:
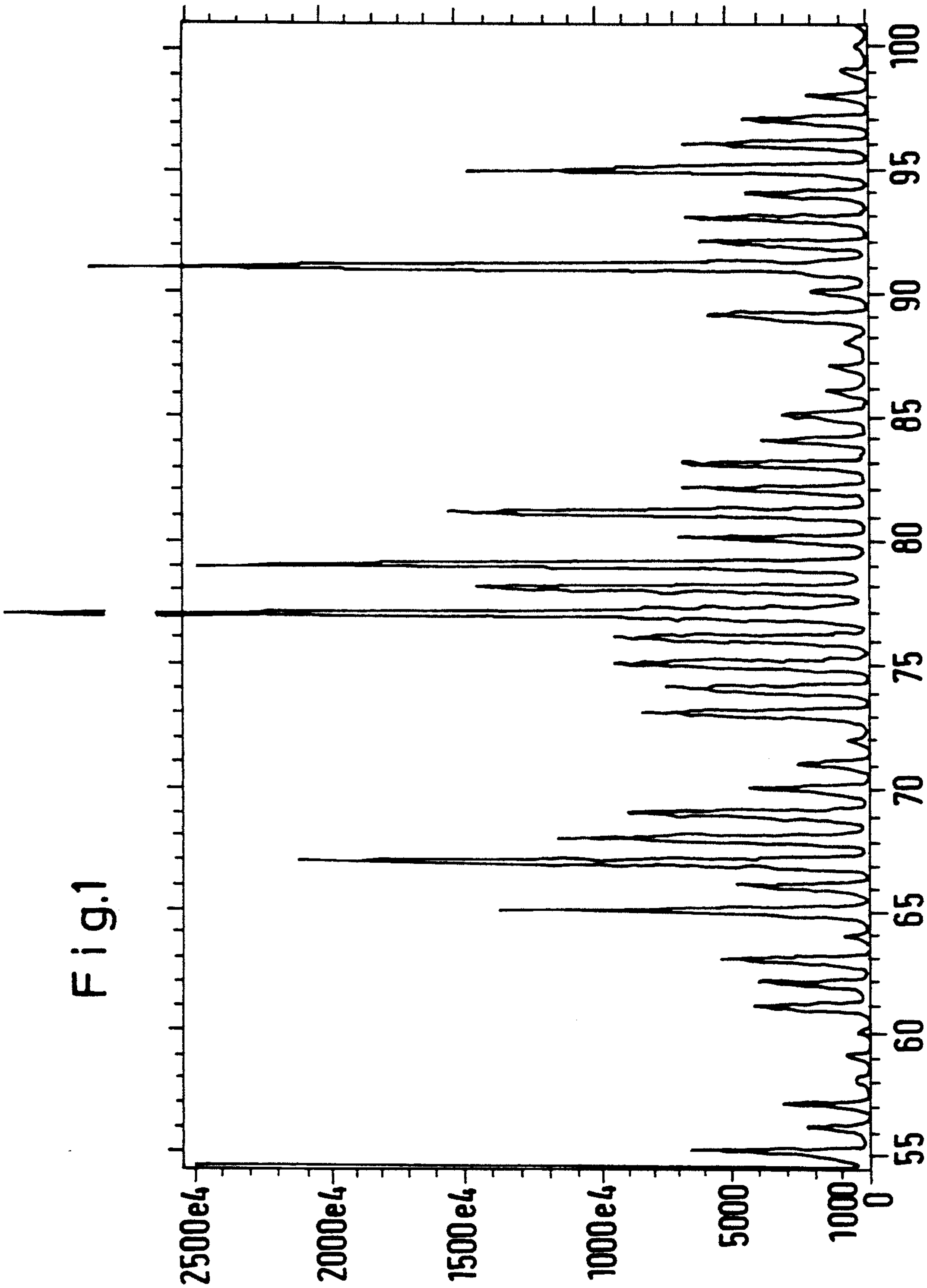
FIG. 1 illustrates a mass spectrum in the mass range from 55 to 100 obtained by analysis of ambient air.

FIG. 1 illustrates a mass spectrum of laboratory air containing impurities. The mass spectrum is used for isolating ions. As illustrated in the Figure, dominant peaks at the mass number m=67, m=77 and m=91 are present. A particular ion mass, such as m=78, can be isolated in accordance with the principles of the method of the present invention. For example, the side containing masses lower than m=78 is first purified followed by the side having masses greater than m+1, or 79, by using the non-linear resonance in the quistor.

Figure 2:
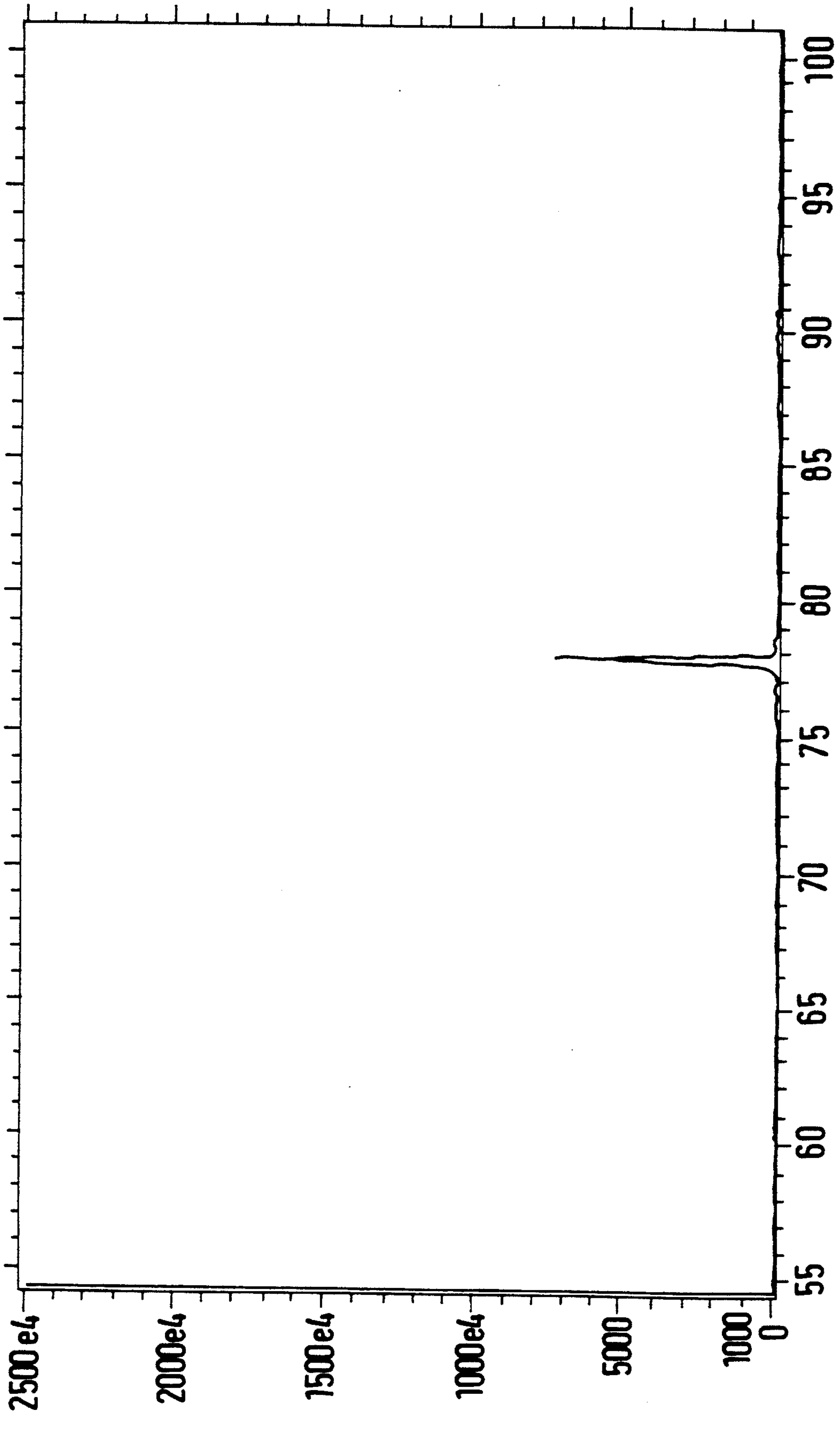
FIG. 2 illustrates a mass spectrum in the mass range from 55 to 100, in which the ion of mass m=78 is isolated in accordance with the principles of the method of the present invention.

FIG. 2 illustrates the results obtained by purifying the mass spectrum illustrated in FIG. 1 to isolate the mass m=78. Virtually all of the ions present have mass m=78, and a yield of approximately 30% is achieved. The other mass components are largely suppressed, despite the fact that masses 77 and 79 were dominated in the original spectrum.

Figure 3:
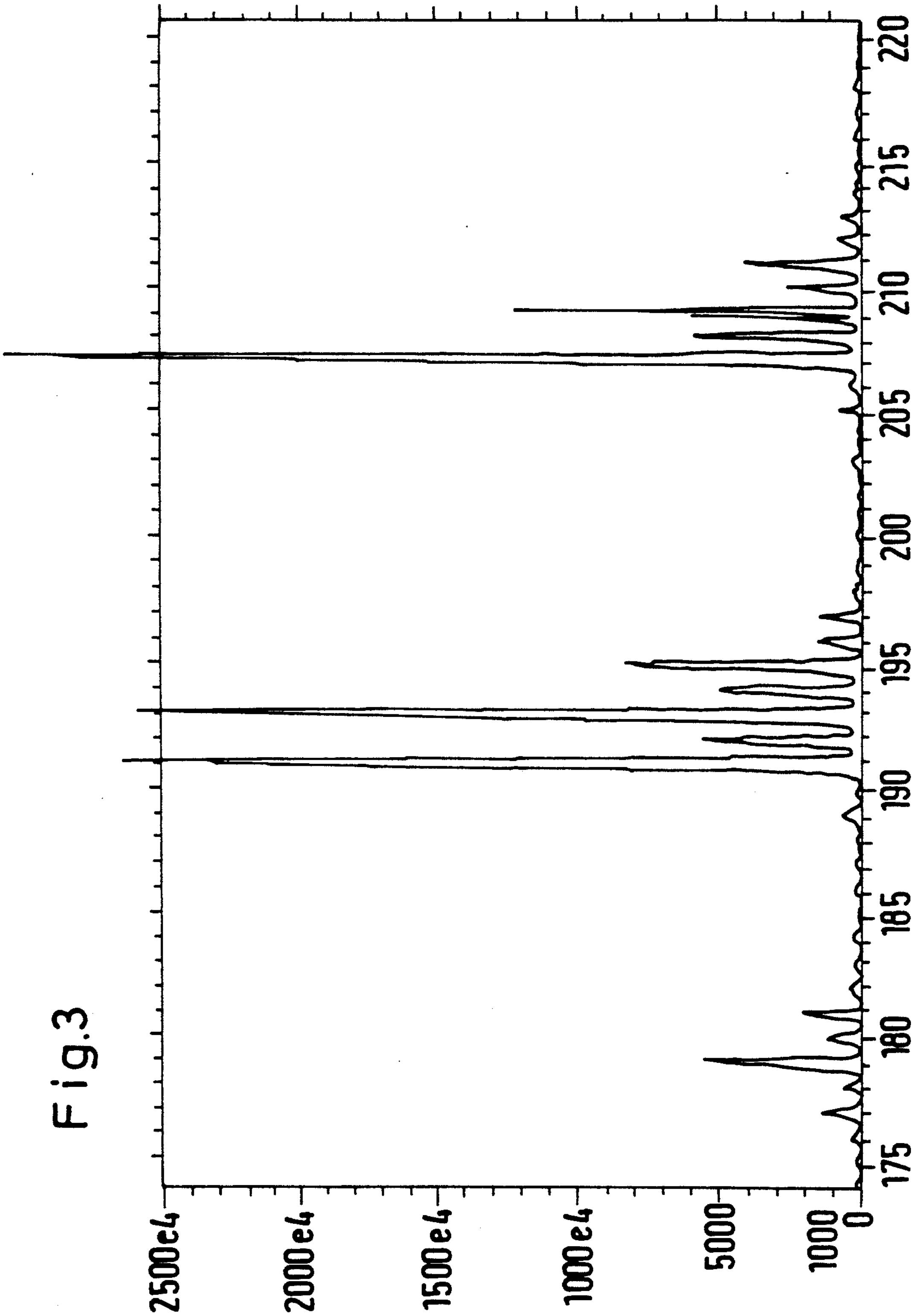
FIG. 3 illustrates a mass spectrum in the mass range from 175 to 220.

FIG. 3 illustrates a mass spectrum of bleeding of a silicon membrane in the mass region ranging from m=175 to m=220. Three groups of peaks are recognizable. The first peak is at m=179, dominates the first group. In the second group, there are two approximately equally populated states at m=199 and m=193. In the third group, a peak at m=207 forms the greatest proportion. A selected mass can then be isolated from the mass spectrum in accordance with the principles of the method of the present invention. For example, the mass m=192, an ion from the second group, can be isolated despite the low population of the m=192 group compared to the neighboring level m=193.

Figure 4:
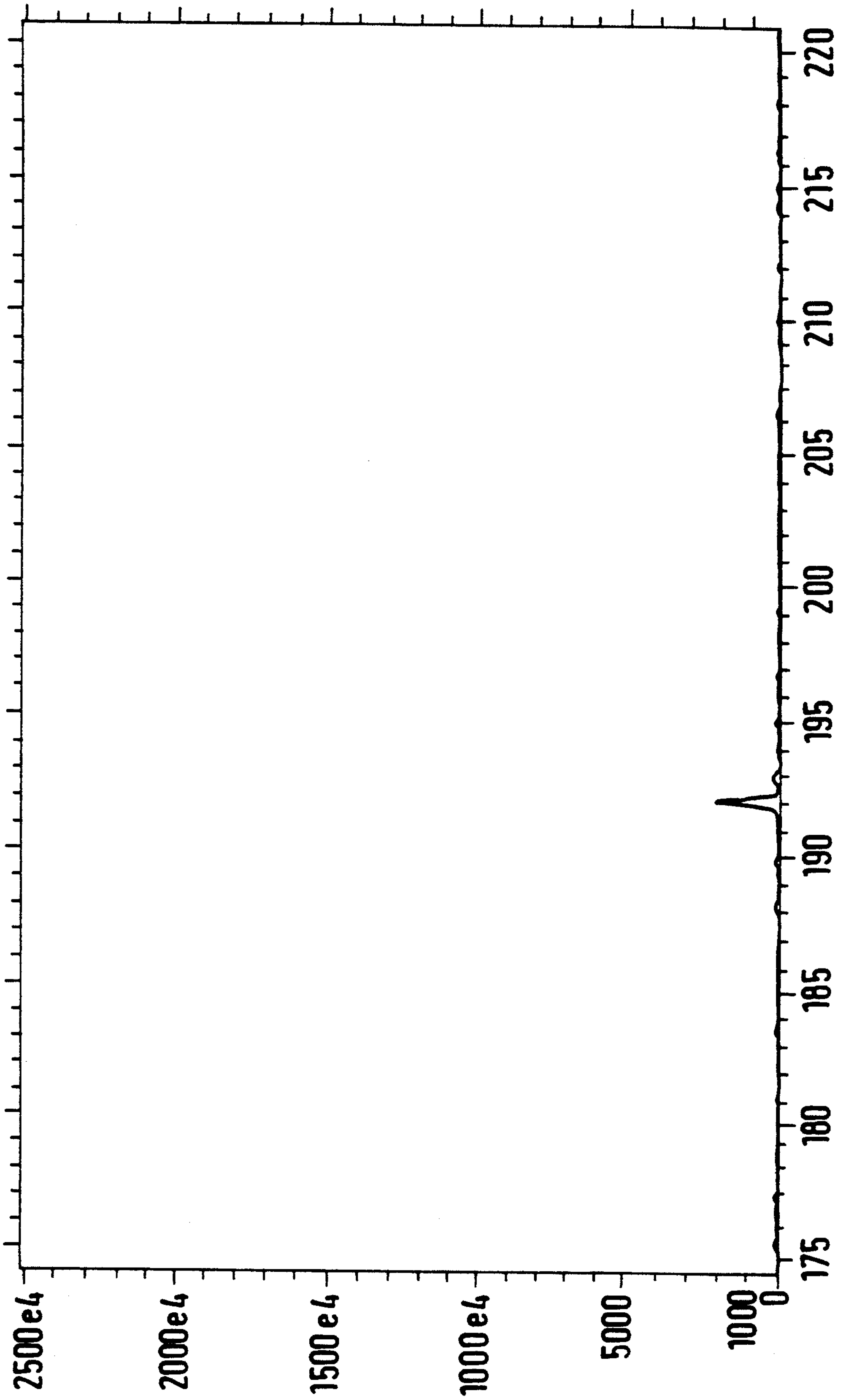
FIG. 4 illustrates a mass spectrum in the mass range from 175 to 220, in which the ion having the mass number m=192 is isolated in accordance with the principles of the method of the present invention.

The results of isolating the mass m=192 from the mass spectrum illustrated in FIG. 3 is shown in FIG. 4. The ion of mass m=192 was obtained by first purifying the side containing masses lower than 192 and then applying the non-linear resonance in the quistor to masses greater than m+1. A yield of approximately 30% was achieved in comparison with the value in the initial spectrum. Further, the neighboring states m=191 and m=193 were almost completely suppressed. This illustrates the high selectivity of ion purification of undesired ion masses in accordance with the principles of the method of the present invention.

Further, the method of the present invention is operative despite an overload of the ion trap. For example, even where an approximately 20-fold overload of ions is present in the ion trap, where normal recording of spectra is completely impossible due to the space charge, the method of the present invention is operative.

Although various minor modifications may be suggested by those versed in the art, it should be understood that I wish to embody within the scope of the patent granted hereon all such modifications as reasonably and properly come within the scope of my contribution to the art.

I claim:

1. A method of well-defined ejection of undesired ions of mass m+n, with $n \geqq 1$, while keeping desired ions of mass m in an ion trap of an ion trap mass spectrometer, said ion trap mass spectrometer having two end cap electrodes and one annular electrode, wherein a high-frequency quadrupolar storage field with at least one superposed weak multipolar field is generated in said ion trap mass spectrometer, comprising the steps of:

(a) adjusting the amplitude of a high-frequency storage field to satisfy a non-linear resonance condition of said at least one superposed weak multipolar field for said ions of mass m+n; and (b) applying a high-frequency excitation voltage to said two end caps of said ion trap mass spectrometer to weakly oscillate all ions, said ions of mass m+n thereby receiving energy through non-linear resonance from said high-frequency storage field and leaving said ion trap, whereas ions of mass m remains inside said ion trap.

2. A method as claimed in claim 1, wherein n=1, further comprising the step of successively applying steps a and b to ions of mass m+2, . . . , m+n.

3. A method of well-defined ejection of ions of mass m+1, with minimal loss of ions of mass m from an ion trap of an ion trap mass spectrometer, said ion trap mass spectrometer having two end cap electrodes and on annular electrode, in which a high-frequency quadrupolar storage field with at least one superposed weak multipolar field is generated, comprising the steps of:

adjusting the amplitude of a high-frequency storage field to satisfy a non-linear resonance condition of said at least one superposed weak multipolar field for ions of mass m+1; and applying a high-frequency excitation voltage to said two end caps of said ion trap mass spectrometer to weakly oscillate all ions, said ions of mass m+1 receiving energy through non-linear resonance from said high-frequency storage field and leaving said ion trap, whereas ions of mass m remain inside said ion trap.

4. A method as claimed in claim 3, further comprising the step of superposing a weak octupolar field on the quadrupolar field such that the ions of mass m+1 obtain the octupolar resonance $\beta_2+\beta_r=1$.

5. A method as claimed in claim 3, further comprising the step of sweeping the frequency of said high-frequency excitation voltage to oscillate ions around said ions of mass m+1, and simultaneously remove all ions of mass greater than m+1 from said ion trap by resonance excitation.

6. A method as claimed in claim 5, further comprising the step of eliminating at least one additional ion mass from ions of mass m+n by non-linear resonance, such that the remaining masses are eliminated by the step of sweeping said high-frequency excitation voltage.

7. A method as claimed in claim 5, wherein sweeping the frequency of said high-frequency excitation voltage is further defined by increasing the frequency of said high-frequency excitation voltage corresponding to sweeping of ion masses from higher to lower values.

8. A method as claimed in claim 3, further comprising the step of increasing the amplitude of said high-frequency storage field for a predetermined time to an amplitude at which all ion masses below m are exposed to instability conditions of said high-frequency quadrupolar field and removed from said ion trap.

9. A method as claimed in claim 3, further comprising the step of increasing the rate of withdrawal of the analyzed ions without effecting the mass resolution capacity by using electrodes of a specified shape, where the quadrupolar potential $$P_q=(A_2/4z_o^2)(r^2-2z^2)[U-V\cos(\omega t)],$$

is overlaid only by a sextupole potential $$P_s=(A_3/4z_o^4)(3r^2z-2z^3)[U-V\cos(\omega t)]$$

and an octupole potential $$P_o=(A_4/4z_o^4)(r^4+8z^4/3-8r^2z^2)[U-V\cos(\omega t)],$$

with:

r=the distance from the z axis; z=the distance from the plane z=0; $z_o$=the distance of an end cap from the center z=0; $A_2$=the thickness of the quadrupole field; $A_3$=the thickness of the sextupole field; $A_4$=the thickness of the octupole filed; U=the value of the DC voltage; V=the peak value of the AC voltage; $\omega$=the angular frequency of the AC voltage, and t=time.

10. A method as claimed in claim 3, further comprising the step of using electrodes of a specified shape to increase the rate of withdrawal of the analyzed ions without effecting the mass resolution capacity, where the quadrupolar potential $$P_q=(A_2/4z_o^2)(r^2-2z^2)[U-V\cos(\omega t)],$$

is overlaid only by a sextupole potential $$P_s=(A_3/4z_o^4)(3r^2z-2z^3)[U-V\cos(\omega t)].$$

11. A method as claimed in claim 3, further comprising the step of applying electrodes having a specified shape to increase the rate of withdrawal of the analyzed ions without effecting the mass resolution capacity, where the quadrupolar potential $$P_q=(A_2/4z_o^2)(r^2-2z^2)[U-V\cos(\omega t)],$$

is overlaid only by a octupole potential $$P_o=(A_4/4z_o^4)(r^4+8z^4/3-8r^2z^2)[U-V\cos(\omega t)].$$

12. A method of well-defined ejection of undesired ions of mass m+n, with $n \geqq 1$, while keeping desired ions of mass m in an ion trap of an ion trap mass spectrometer, comprising the steps of:

adjusting the amplitude of high-frequency storage field to satisfy a non-linear resonance condition of a multipolar field generated in said ion trap mass spectrometer, for ions of mass m+n; and removing said ions of mass m+n from said ion trap by non-linear resonance, said non-linear resonance ejecting said ions when their secular frequency reaches the frequency of the non-linear resonance and ions of mass m+1 being ejected from the ion trap without being resonantly excited.

* * * * *